Jan. 14, 1969 P. R. JOHANNESSEN 3,422,355
PARAMETRIC FREQUENCY CONVERTER FOR TRANSMITTING ANTENNA
Filed April 22, 1965

INVENTOR
PAUL R. JOHANNESSEN

BY

ATTORNEY

United States Patent Office 3,422,355
Patented Jan. 14, 1969

3,422,355
PARAMETRIC FREQUENCY CONVERTER FOR TRANSMITTING ANTENNA
Paul R. Johannessen, Lexington, Mass., assignor to Sylvania Electric Products Inc., a corporation of Delaware
Filed Apr. 22, 1965, Ser. No. 450,079
U.S. Cl. 325—145
Int. Cl. H04b 1/04; H03c 3/12
5 Claims

ABSTRACT OF THE DISCLOSURE

A parametric frequency control system employing a parametric converter having a pump circuit coupled in a balanced configuration to an idler circuit and a tuned signal circuit. A source of energy, supplied to the parametric converter at the pump frequency, is coupled simultaneously to the tuned circuit and the idler circuit causing each circuit to oscillate at a distinct frequency the sum of which equals the pump frequency. By the use of a suitable modulator source, the impedance of a variable reactance, contained within the idler circuit, is changed resulting in frequency modulation of the output idler frequency.

---

This invention relates to communications systems and more particularly to parametric frequency control techniques therefor.

In VLF communication systems, operating for example in the 10–20 kc. range, electronic transmitters are not always suitable for the high power involved. Transmission power at these frequencies is often generated by an alternating current generator and magnetic frequency multipliers, which can provide the requisite high power in an efficient and reliable manner. Modulation of this power is, however, still a major problem. VLF systems are often frequency shift keyed and, conventionally, frequency modulation is accomplished by varying the rotary speed of the generator; a method which is slow and limited in bandwidth to a few cycles per second.

It is, therefore, an object of the present invention to provide a modulation technique which does not require variation in machine speed.

Another object of the invention is to provide a frequency control system using parametric techniques.

In accordance with the present invention, a parametric converter is employed which has an idler circuit of variable resonant frequency. The converter is energized by power from a suitable source, for example the generator-frequency multiplier, and produces a signal at the idler frequency which can be varied by changing the resonant frequency of the idler circuit. Frequency modulation can thereby be easily achieved. This parametric technique is not limited to VLF systems but is also useful in other embodiments to provide frequency control.

The invention will be more fully described in the foregoing detailed description, taken in conjunction with the accompanying drawings, in which.

Figures 1, 2:
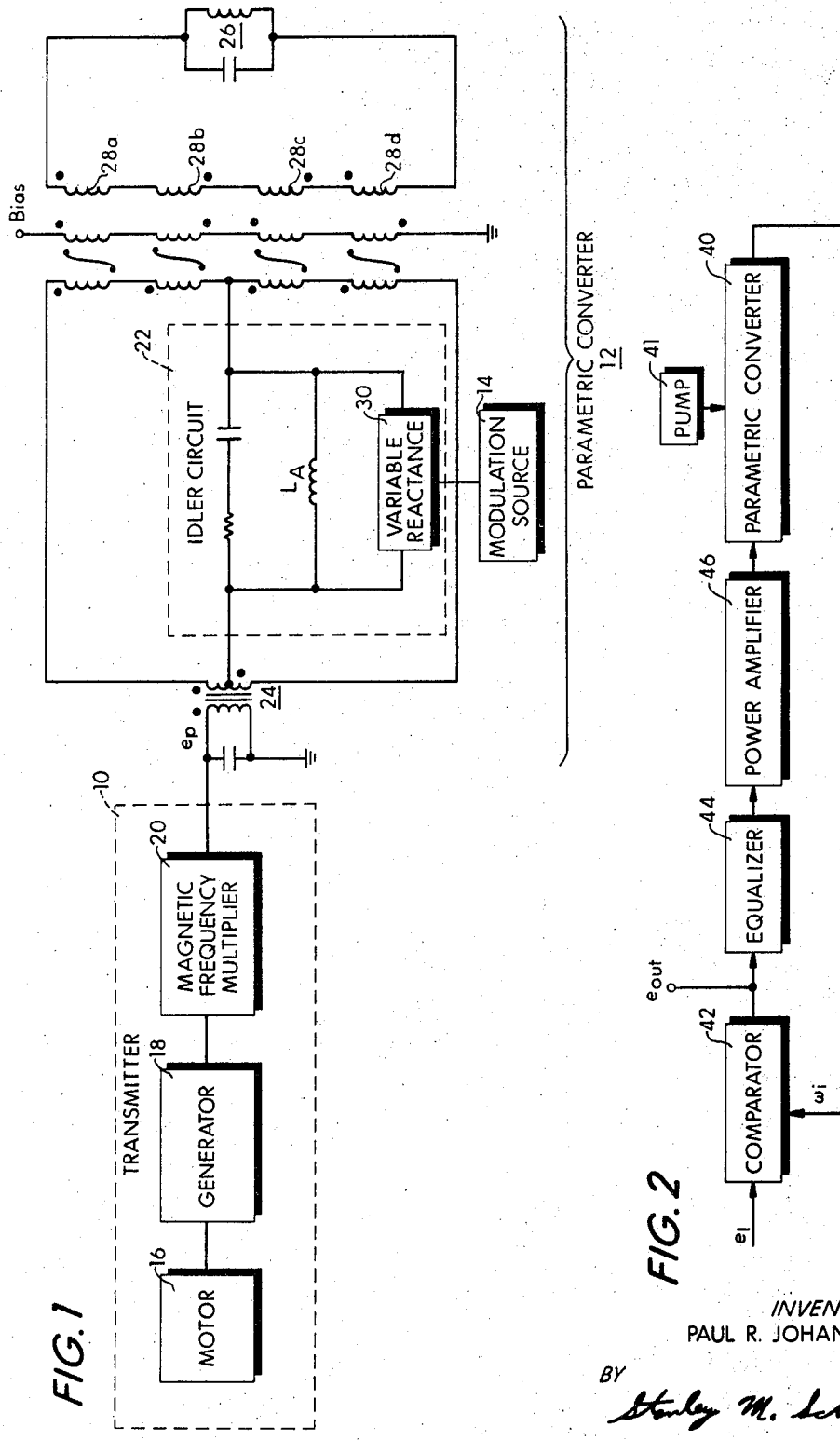
FIG. 1 is a diagrammatic representation of one embodiment of the invention.
FIG. 2 is a block diagram representation of another embodiment of the invention.

Referring to FIG. 1, there is shown a VLF communication system which includes a transmitter 10, a parametric converter 12, and a source of modulating signals 14. The antenna $L_A$ forms part of the idler circuit of the parametric converter.

Transmitter 10 includes a motor 16 which drives an alternating current generator 18, which, in turn, energizes a magnetic frequency multiplier 20 to produce a signal $e_p$ of frequency $\omega_p$ which is utilized as the pump frequency of the parametric converter. The converter has an idler circuit 22 which is coupled to the pump signal via a tuned circuit 24, and to tuned circuit 26 via four saturable reactors 28a–28d. The operation of such parametric circuits is well known and will, therefore, be only briefly described herein. Tuned circuit 26 has a resonant frequency $\omega_s$, and idler circuit 22 has a resonant frequency $\omega_i$ which is the difference between the pump frequency and $\omega_s$. A pump signal $e_p$ of frequency $\omega_p$ applied to the circuit causes a signal of frequency $\omega_i$ to be generated at the output of the idler circuit. The idler frequency is dependent upon the resonant frequency of the idler circuit and can be varied by changing the resonant frequency of this circuit. The stability of the idler frequency is not dependent upon the frequency stability of the pump source; thus, slight frequency variations in the power source do not affect the output frequency. A slight frequency variation in the power signal is compensated by a variation in the $\omega_s$ frequency so that the difference between $\omega_p$ and $\omega_s$, which is the idler frequency $\omega_i$, is a constant. This operation is achieved by employing an idler circuit which is narrow band compared to the bandwidth of tuned circuit 26.

Frequency modulation is achieved by a signal from a modulation source 14 which varies the reactance of a variable reactor 30 forming part of idler circuit 22. The resonant frequency of the idler circuit is thereby varied, causing a corresponding variation in the frequency of the output signal appearing on the antenna $L_A$. As the frequency of the idler circuit is varied, the resonant frequency of circuit 26, which is of wider band than the idler, tracks such that the relationship $\omega_i = \omega_p - \omega_s$ remains valid.

An electrically controllable linearly variable reactance which is especially suited for use in the present system is described in copending application S.N. 435,252, filed Feb. 25, 1965, now Patent No. 3,373,346, issued Mar. 12, 1968, and also described in an article entitled "Automatic Tuning of High-Q Antenna for VLF FSK Transmission," P. R. Johannessen, IEEE Transactions of the Professional Technical Group on Communications Systems, vol. CS–12, No. 1, March 1964.

In a frequency shift keyed system, the reactance is varied between first and second values to cause the idler frequency to vary correspondingly between a first and a second frequency. Thus, the transmitted signal is modulated simply by varying the resonant frequency of the idler circuit between two values to provide the first and second modulating frequencies.

The invention is also useful to provide automatic frequency or phase control. As illustrated in FIG. 2, the parametric converter 40, of the type described hereinbefore, is employed in a feedback loop which includes a comparator 42, an equalizer 44 and a power amplifier 46. Comparator 42 may be either a frequency discriminator or phase detector depending upon whether the loop is to be frequency locked or phase locked. The equalizer is well known in feedback systems and adjusts the gain of the loop so that proper stability can be achieved. In operation, a signal $e_1$ is applied to comparator 42, the output of which is applied via the equalizer and power amplifier to the variable reactance of the idler circuit of parametric converter 40. A pump signal is applied to the converter from a suitable pump source 41, and the idler signal $\omega_i$ is fed back to the comparator 42. As described hereinbefore, variation of the resonant frequency of the idler circuit causes corresponding change in the idler frequency. Thus, frequency or phase variations in input signal $e_1$ cause the idler frequency to change such that the frequency or phase of the feedback signal tracks the input signal. The frequency or phase of the comparator output $e_{out}$, depending upon the type of comparator employed, is thereby adjusted to maintain the frequency or phase of the output signal constant.

From the foregoing, it is evident that a parametric frequency control has been provided which is especially useful in VLF communication systems. The invention is not to be limited by what has been particularly shown and described, except as indicated in the appended claims.

What is claimed is:
1. A parametric frequency converter comprising:
   a source of energy;
   a source of modulating signals;
   a pump circuit operative in response to said energy source to oscillate at a fixed frequency;
   an idler circuit of resonant frequency variable in response to said modulating signals and operative in response to said energy source to generate an output signal; and
   a tuned signal circuit operative in response to said energy source to oscillate at the difference frequency between the frequency of said pump circuit and the idler circuit frequency.
2. The invention according to claim 1 wherein said tuned signal circuit includes a balanced network intercoupling said tuned signal circuit to idler circuit and pump circuit.
3. The invention according to claim 2 wherein said balanced network comprises a saturable reactor network.
4. The invention according to claim 1 wherein said idler circuit includes a variable reactance network operative in response to said modulating signals to vary the resonant frequency of said idler circuit.
5. The invention according to claim 4 wherein said idler circuit further includes an antenna operative to radiate a signal at the resonant frequency of said idler circuit.

References Cited

UNITED STATES PATENTS

| | | | |
|---|---|---|---|
| 2,830,176 | 4/1958 | Howell et al. | 325—145 |
| 3,183,456 | 5/1965 | Seidel | 332—30 |
| 3,253,227 | 5/1966 | Uenohara | 332—30 |

RALPH D. BLAKESLEE, *Primary Examiner.*

U.S. Cl. X.R.

325—126, 127; 332—29